United States Patent [19]

Barozzi

[11] Patent Number: 4,936,560
[45] Date of Patent: Jun. 26, 1990

[54] WORKPIECE-SUPPORT ASSEMBLY FOR AUTOMATIC MACHINING LINES

[76] Inventor: Gian P. Barozzi, Via Desti 7, Crema (Cremona), Italy

[21] Appl. No.: 181,305

[22] Filed: Apr. 13, 1988

[30] Foreign Application Priority Data

Apr. 14, 1987 [IT] Italy ................ 20112 A/87

[51] Int. Cl.$^5$ .................................. B25B 1/24
[52] U.S. Cl. .................... 269/266; 33/561.1
[58] Field of Search .......... 269/289 R, 296, 265, 269/267, 254 R, 224; 40/427, 579; 33/175

[56] References Cited

U.S. PATENT DOCUMENTS

| | | | |
|---|---|---|---|
| 2,266,457 | 12/1941 | Wolff | 33/175 |
| 3,983,632 | 10/1976 | Halsted | 33/175 |
| 4,200,272 | 4/1980 | Godding | 269/266 |
| 4,572,564 | 2/1986 | Cipolla | 269/266 |
| 4,752,063 | 6/1988 | Nagy | 269/266 |

FOREIGN PATENT DOCUMENTS

| | | | |
|---|---|---|---|
| 117458 | 9/1943 | Australia | 269/266 |
| 1584445 | 2/1981 | United Kingdom | 269/266 |

*Primary Examiner*—Judy Hartman
*Attorney, Agent, or Firm*—Herbert Dubno

[57] ABSTRACT

The fixture for supporting workpiece of any shape in automatic machining lines according to the invention has a multiplicity of parallel pins with vertical axes, arranged according to a regular pattern in parallel rows, slidably lodged in corresponding holes made in a pair of spaced apart parallel support plates, protruding in their rest position from the upper side of the plate by a value equal or bigger than the maximum depth of the planned impression, having frictional elements for locking in the axial position assumed by the pins as a result of the action of the impression-forming unit. A device for resetting the rest positions of the pins is also provided for the cancellation of the impression.

13 Claims, 4 Drawing Sheets

WORKPIECE-SUPPORT ASSEMBLY FOR AUTOMATIC MACHINING LINES

FIELD OF THE INVENTION

My present invention relates to a fixture for the support of workpieces of various shapes in automatic machining lines.

BACKGROUND OF THE INVENTION

In a large number of production runs, machining operations are performed automatically, with specific fixtures being used for the machining and handling of the workpieces, in order to achieve maximum efficiency and productivity.

In particular, for each workpiece often there are several successive machining steps, which are conveniently performed in an automatic line, wherein the workpieces are automatically transferred via transporters or the like from one machine to the other. The machines can be conveniently equipped with automatic manipulators (robots) for removing the workpiece from the transporting line, effecting their transfer to the machine and subsequently returning them to the transfer line.

For this purpose, it is generally necessary that the workpieces to be machined be arranged in an orderly manner in a support fixture of the transport line, consisting of cassettes or pallets, with shapes adjusted to receive and maintain the workpieces in a well-determined position, particularly in the cases where the workpieces have to be handled by automatic manipulators or robots.

In such cases, it is desirable to provide support fixtures which negatively reproduce the contours of the workpiece to be received. It is necessary to have a number of such pallets equal to the number of positions in a magazine, in the case of magazine-fed machines, and in the case of line transporters, as many pallets as there are successive positions on the line.

In any case, the number of such support fixtures for workpieces which a machinery line may require is quite high, and can vary between tens of pieces to several hundred.

In the case when on the same machine or system, workpieces of various shapes have to be machined, it is necessary to provide a complete series of support fixtures for each type of workpiece to be machined, with high production costs and considerable time and effort for the replacement of the support fixtures, every time the type of workpiece is changed.

This of course creates an impediment to automation, making it preferable in many cases to have an operator who can manually transfer the pieces to the operating machine, instead of deploying an automatic manipulator, which requires a large number of support fixtures.

OBJECT OF THE INVENTION

It is thus the object of the invention to provide an improved fixture for the support of workpieces in an automatic machining line which can be used for a variety of workpieces with different shapes, and which can be deployed in a simple manner to receive the workpieces in an accurate position adjusted to their shape and to the preselected positioning, whatever that might be.

SUMMARY OF THE INVENTION

This and other objects, which will become apparent hereinafter, are obtained with the present invention, which provides a fixture for the support of workpieces of any shape in automatic machining lines, consisting of a plurality of parallel pins with vertical axes arranged in regular patterns in parallel rows, slidably received in corresponding holes of a pair of plates, which are spaced apart and mutually parallel, the pins protruding from the upper part thereof, in their rest position, by a length equal or bigger than the maximum depth of the planned impression, frictional locking means being provided to lock the pins in their axial position assumed under the action of means for prearranging the impression, additional means for resuming the rest position of same pins being also provided for the cancellation of the existing impression.

In more general terms the invention comprises:

a pair of parallel, spaced apart support plates formed with mutually registering holes in a regular pattern of spaced-apart rows of holes spaced from one another along a respective row;

respective pins received in registering holes of the support plates and having axes perpendicular to the support plates, whereby the pins are disposed in a gridlike array in mutually spaced relation along respective mutually parallel rows with the rows of pins being mutually spaced apart transversely of the pin rows, the pins projecting from an upper one of the support plates in extended rest positions of the pins by a distance greater than a maximum depth of an impression to be formed by the array of pins to receive a workpiece, the pins being axially slidable from the rest position into retracted impression-forming positions relative to the support plates to form the impression; and means for frictionally arresting the pins in respective extended and retracted positions, the support plates, the pins and the means for frictionally arresting the pins forming a fixture displaceable with a workpiece received in the respective depression along the machining line.

The frictional locking means for locking the pins in their axial position assumed as a result of the action of impression-forming means consist of elastic elements interpositioned with elastic deformation between each of the parallel rows of pins in the space comprised between the two parallel support plates, capable to exercise a thrust in the transverse direction with respect to the axes of the pins, generating a friction effect superior to the axial forces acting upon the pins during the support of the selected workpiece and inferior to the axial forces acting upon the pins through the impression-forming means and the means for resuming the rest position.

In particular, the friction locking means can consist of lamellar springs extending the length of a row of pins, curved in the direction of the smaller dimension, having the larger sides provided with notches delimitating a plurality of opposite lamellee, which, when the lamella is in position between two parallel rows of pins, press against the pins of one of the rows, applying individually to each one of them a transversal thrust generating a friction reaction sufficient to maintain the axial position assumed by the pins under the effect of the force resulting from the manipulation of the workpiece, while allowing the axial sliding of the pins independently, under the thrust of the impression-forming means or of the means for resuming the rest position of the pins.

The pins are provided at opposite extremities with head increasing the diameter of the pins to a value exceeding the diameter of the holes of the plates in which the pins are inserted, in order to prevent their escape, having terminal plane surfaces, without bevellings, roundings and the like.

The impression-forming means can consist of a former (matrix, model) carried by a pressing device located above the fixture in its idle station preceding the placing of a workpiece on the fixture and capable to be lowered against the pins, causing their axial sliding into the corresponding holes of the plates, by a value corresponding to the shape of the model, reproducing the contours of the workpiece to be placed on the fixture.

The model or formers can consist of one of the workpieces to be supported, fastened to the pressing device, if it has adequate strength, or it can consist of a model of a workpiece to be placed on the support, made of a material with adequate structural and superficial strength, reproducing the contour of the pieces to be placed on the fixture, identically or in a simplified or approximate manner.

The means for resuming the rest position of same pins, with the cancellation of the previous impression, consist of a pressing device located underneath the fixture in its idle or holding station, preceding the impression-forming means, capable to act upwardly with a mobile portion with plane surface against the pins protruding downwardly from the lower support plate, thereby raising all of the pins up to the same projection level with respect to the upper support plate.

In a particular embodiment, the frictional locking means for locking the pins in their axial position assumed as a result of the action of the impression-forming means, include also controllable locking means for the pins.

In a preferred embodiment, such controllable locking means for the pins comprises of a pair of arresting or locking plates, having holes arranged according to the same pattern of the holes of the support plates, respectively located above and underneath the upper and the lower pin support plate, in contact therewith. The locking plates are laterally translatable via members which can be controlled from the outside, into a position wherein the axes of the holes of the arresting plates and the axes of the holes of the support plates coincide and into another position wherein these axes are mutually deviated by a value capable to induce an elastic deformation of the plates and the pins and a transversal strain in the pins, sufficient to prevent through friction the axial sliding of the pins in the holes.

The externally controllable means for the lateral translation of the arresting plates with respect to the support plates comprise means with an eccentric arranged between the arresting plates and the support plates, equipped with coupling means with external rotation members, the eccentricity of these means being so selected as to determine with one rotation between a rest position and a locked position the desired deviation between the axes of the holes of the plates.

In order to increase the precision of the placement of the workpiece on the support fixture, the parallel rows of pins can be inclined with respect to at least one of the vertical flanks of the pieces to be received.

BRIEF DESCRIPTION OF THE DRAWING

The above and other objects, features and advantages of our invention will become more readily apparent from the following description, reference being made to the accompanying highly diagrammatic drawing in which.

SPECIFIC DESCRIPTION

Figure 1:
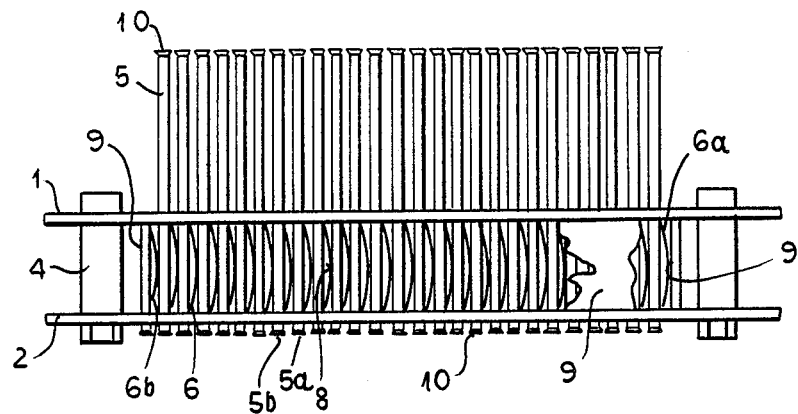
FIG. 1 is a side elevational view, partly broken away, of the fixture according to the invention.

As shown in FIG. 1, the support fixture for workpieces in an automatic machining line comprises a pair of plates 1, 2, provided with a plurality of holes 3, arranged according to a rectangular pattern or grid spaced apart by four columns or posts 4, provided with respective locking screws.

Figure 3:
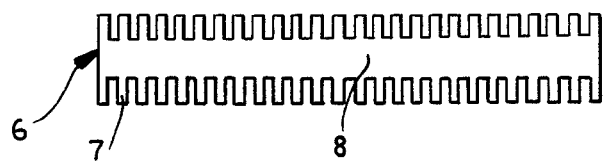
FIG. 3 is a elevational view of a spring removed from the fixture.

Within the holes 3 are lodged corresponding straight pins, having a length exceeding the distance between the plates. Between each row of pins 5 a lamellar spring 6 is located, as shown in a frontal view in FIG. 3. The spring 6 is a strip which has a multitude of protruding lamellae or tongues 7, in a number and a position corresponding to those of the pins of the row against which the spring is going to be inserted. The spring is shaped with a bow in the direction of the smaller side, as shown in FIG. 1 and as a result, it is arranged so that its central portion 8 presses against the pins of another row 5a as while the lamellae or tongues 7 press, elastically deflected, against the respective pins of the other adjacent row 5b, keeping the pins 5 locked in their axial position through friction.

Surrounding the grid defined by the holes of the pins 5, between the plates 1, 2, lateral restraining shoulders 9 are provided, affixed to the support plates 1, 2 with the purpose of giving support to the outermost springs 6a, 6b in one direction, and in the other direction to prevent the lateral escape of the springs.

In FIG. 1, the anterior restraining shoulder is only partially represented, in order to show clearly the portion of pins and springs behind it. The upper and lower extremities of the pins 5 are upset, after assembly, in such a manner as to form thereon heads 10 which prevents the escape from the corresponding holes of the plates.

Figure 4:
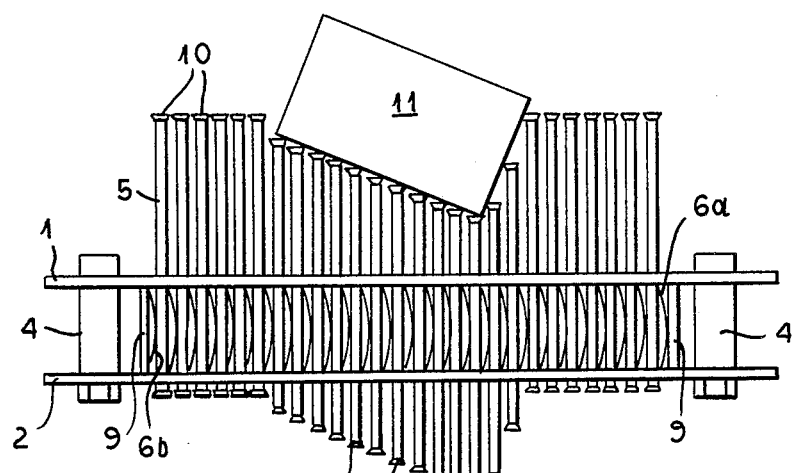
FIG. 4 is a side elevational view diagrammatically showing how the fixture carries an object.

As shown in FIG. 4, the pins 5 can slide in the respective holes of the plates, assuming the profile of the object 11 positioned on the pins, whatever its shape and its orientation.

The friction resulting from the pressure of the springs 6 against the pins thus maintains the pins in position and allows the fixture to give a correct support to the object 11 during the entire machining cycle.

In order to insure maximum accuracy, in accordance with the selected pitch of the pins, the upper surfaces of the heads 10 are planar. This even in the presence of surfaces with substantial inclinations with respect to the pins, such as the surface 11a in FIG. 5, the sliding of the pins is achieved, forming the correct impression, preventing the pins from lateral deflection, without assuming the desired configuration.

Figure 5:
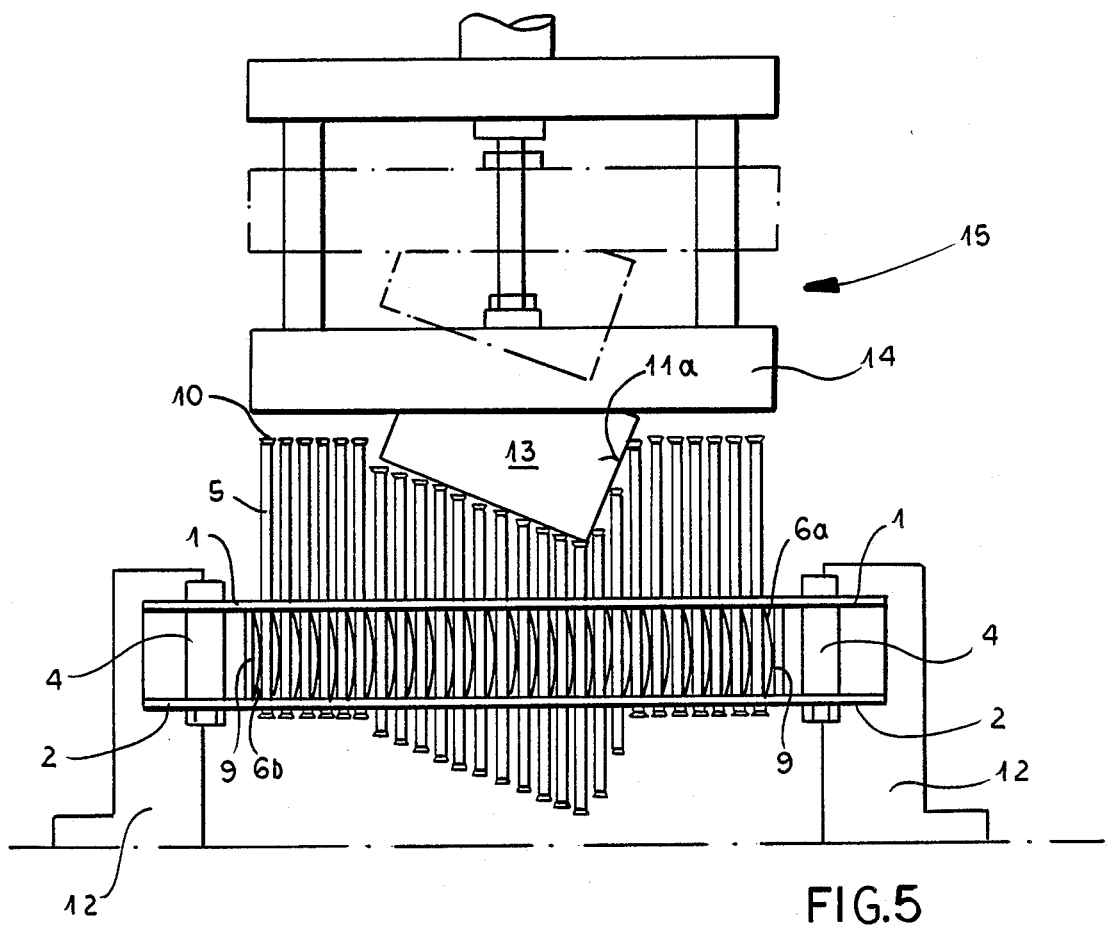
FIG. 5 is a diagrammatic side elevational view of the assembly according to the invention in the impression-forming stage.

As can be seen from FIG. 5, the fixture according to the invention can be supported in the handling equipment via respective supports 12, having any desired shape, connected to the plates 1, 2. These supports have to have a sufficient height to allow the pins 5 to protrude from the lower plate 2 by as must as required by the depth of the desired impression, in order to accommodate the object 11.

In order to make the impression, a model or former 13 of the object to be positioned in the fixture, or even one specimen of the respective object having sufficient resistance, is fastened to the plate 14 of a pressing device 15, schematically shown in FIG. 5. The model 13 is thus pressed against the pins 5, initially all arranged with maximum upward extension, and determines the sliding of pins in respective holes, to the point where they represent a negative or complement of the outline of the model 13, overcoming the friction produced by the springs 6.

The fixture is this way prepared and capable to then receive the piece to be transported, insuring that it is constantly maintained in the correct position, for the entire machining cycle.

A typical machining cycle in fact comprises usually a series of operations performed on the proper machines, to which the piece is transported by automatic manipulators, to which the pieces are transferred by a transport line, and positioned thereon with the aid of the fixture according to the invention. The manipulators can grab the piece and set it in a precise position, which is maintained during the entire cycle, through its successive stages.

At the end of the cycle, before another workpiece is brought into the line, or even in an intermediate position, in the case where the workpiece undergoes shape changes during machining, the impression on the fixture is cancelled, and the subsequent formation of a new impression, is provided with the purpose to insure a continuously correct shape and to eliminate possible distortion of the same impression which occurred accidentally during the preceding machining cycle, or in order to make possible to receive again the workpiece in its modified configuration.

Figure 6:
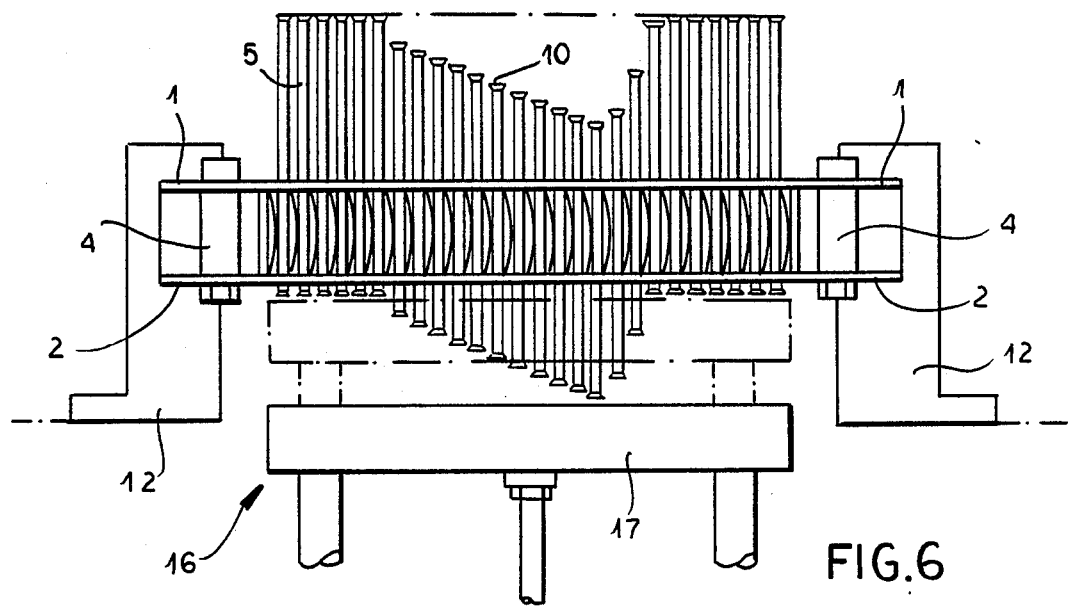
FIG. 6 is a view similar to FIG. 5 showing the fixture according to the invention in the impression-cancelling stage.

For this purpose, as schematically shown in FIG. 6, a pressing device 16 is provided located underneath the support fixture, having a planar plate 17 capable of being pressed against the pins protruding downwardly, rising them against the friction produced by a spring 6, in order to reset the plane configuration of the upper surfaces of the pins, thereby preparing the fixture for receiving a new impression.

Such operations of cancelling the previous impression and of forming the new impression can be performed during the machining of the same type of workpiece, at any cycle, namely each time that a machined piece is discharged and a new workpiece has to be positioned on the fixture, or periodically, corresponding with the number of necessary cycles, in order to check a distortion which would make the impression unacceptable.

A similar operation is also carried out each time when the type of workpiece is changed, substituting the model 13 of the pressing device 15 which has been in use up to this moment, with another one, corresponding to the new type of workpiece.

The model 13 is carried by the plate 14 of the pressing device 15 can consist, as already mentioned, of one of the pieces to be placed on the fixture, appropriately cut and provided with means for fastening to the plate 14. In this way it is possible to use the workpiece as a former if the workpiece is made of a high strength metallic material and subjected, for instance, to a chromium-plating treatment for reinforcement of its surface, to insure the hardness required to resist to the wear due to numerous cycles of use, in addition increasing the size in such a way as to allow the forming of an impression having a small play with respect to the workpiece which has to be received, avoiding possible identation of the former.

In the case of workpieces made of a material which is inappropriate for direct use to set the pins, for instance, having fragile or deformable parts, having made of plastic material and so on, a corresponding model of an appropriate material, such as steel, can be made and, if required, subjected to surface hardening. In such cases, the model does not have to have a shape which is identical to the workpiece, but can have a simplified or approximate profile, which however has the surfaces required to define an impression which can receive the workpiece it is made for in a stable manner and in one position only.

It is also necessary to use a properly made model in the cases where the actual workpiece has a configuration which is prone to get entangled in the pins, such as is the case with thin protruding parts, or flanks with an inclination approaching the vertical, whereby the pins can be laterally flexed when coming in contact with the model, without producing the axial sliding into position which is required. In such situations, and in similar ones where the geometry of the workpiece may require it, it is possible to make a model with an adjusted contour, so that these disadvantages can be avoided.

Even in the case where it is necessary to make a model for forming the impression, in each case it is required to prepare only one single impression-forming element for each type of workpiece, rather than having to prepare for each type of workpiece as many fixtures with a fixed imprint.

In other cases, it can be the workpiece itself of a proper shape and material, which automatically transferred by a manipulator, is pressed against the surfaces of the pin extremities, defining this way the proper impression on the support fixture and thus making totally automatic the handling operations of the workpieces, no matter what their shape and placement.

Figure 7:
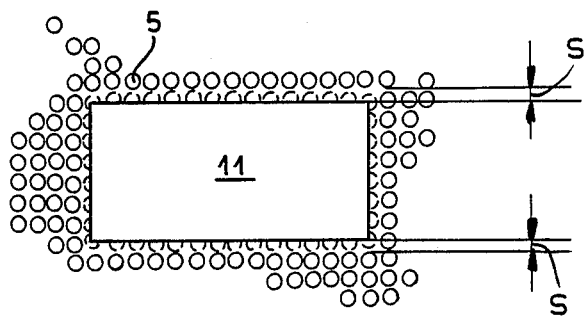
FIG. 7 is a diagram for a possible placement of a workpiece on the fixture.

In this case where pieces having at least two vertical flanks parallel to the pins are used, it is possible to have a limited placement precision, depending on the distance between two contiguous rows of pins. In fact, under such circumstances, a piece 11 as shown in FIG. 7 can skip one row of pins located thereabove with its proper outer edge, leaving this way a lateral space "s" between the flank of the first row of pins which is not lowered, defining the lateral profile of the impression.

If such a situation arises also with respect to the opposite side of the piece, the resulting impression can be excessively large in comparison with the size of the workpiece, which can lead to an unacceptable level of accuracy, even in cases where the pitch between the contiguous rows of pins is at the minimum value acceptable for requirements of mechanical resistance for the plates and pins.

Figure 2:
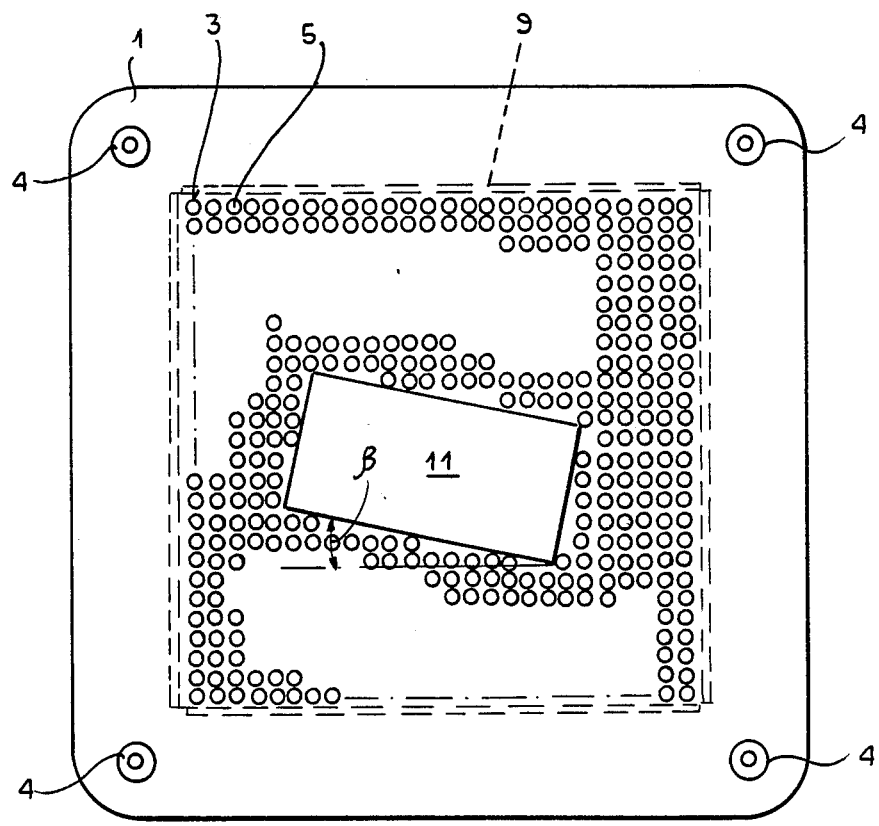
FIG. 2 is a top view of the fixture of FIG. 1.

As illustrated in FIG. 2, the object can have its sides inclined to the rows of pins. FIG. 5 and FIG. 6 show that the surfaces, e.g. the surface 11a of the object 13, can be inclined to the pins themselves.

In any cases, it is advantageous to lock the pins in position, in order to stabilize the impression. For this purpose adjustable means are provided, which are capable of substantially increasing the friction encountered by the pins and preventing their axial sliding.

Figure 9:
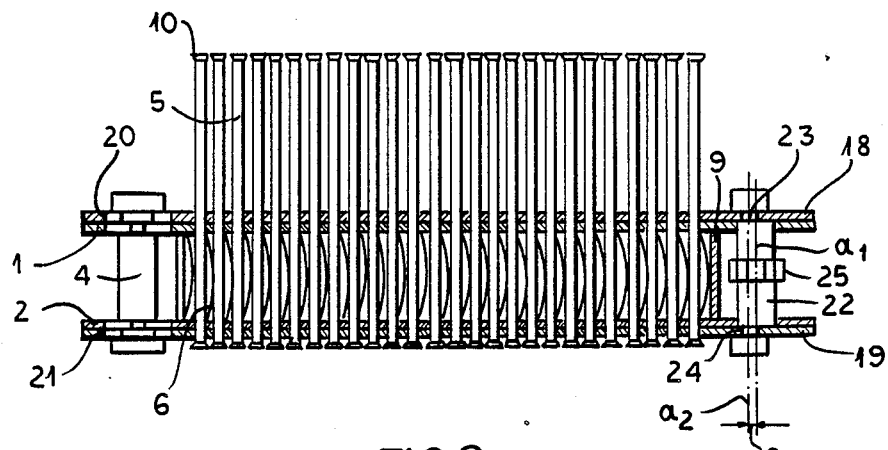
FIG. 9 is a section of the fixture taken along the line IX—IX of FIG. 8.
Figure 8:
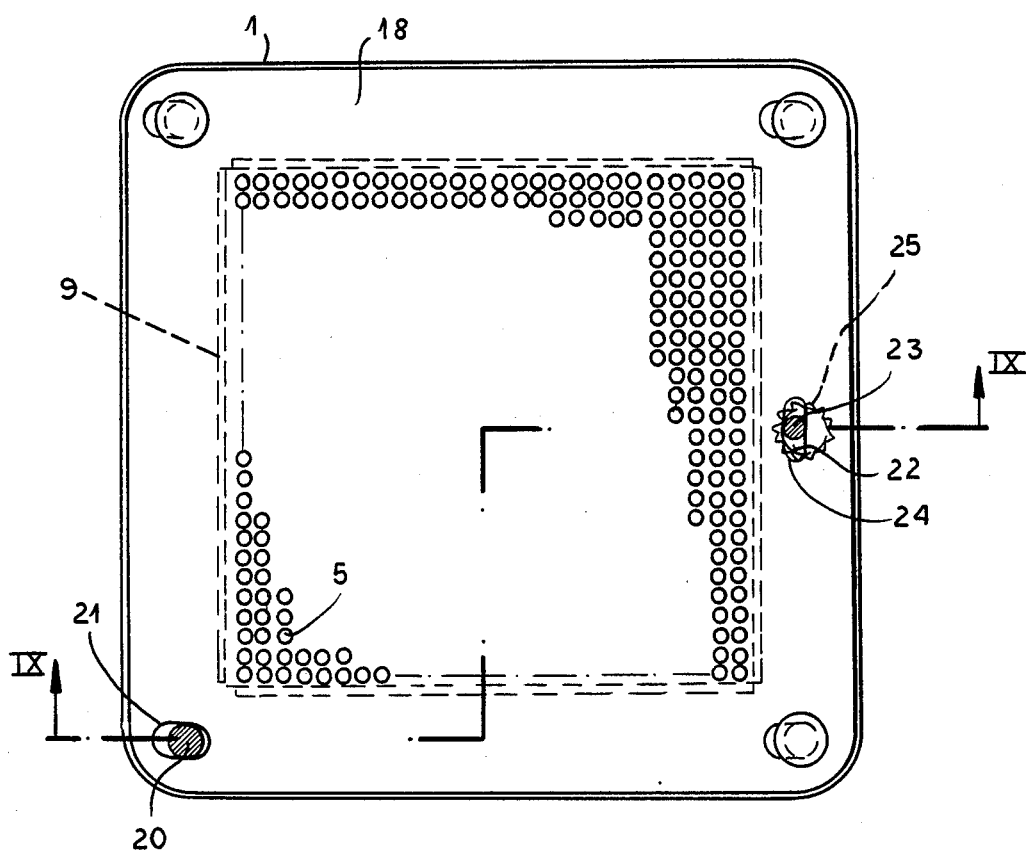
FIG. 8 is a section through the fixture according to the invention seen from above in an alternate embodiment, with a device for locking the fixture in the obtained configuration.

As an example, in FIGS. 8, 9 a fixture is shown having a locking device for the pins consisting of a couple of plates 18, 19, having similar holes to plates 1, 2, correspondingly placed above plate 1 and under plate 2, both being traversed by the pins 5.

Such plates 18, 19 are confined to the respectively adjacent plate 1, 2 by the extreme portions 20 of the tightening head of the spacing columns 4, inserted in the slots 21 of the plates 18, 19; such slots are elongated in mutually parallel directions by an amount which allows a translation, in such direction, of the plates 18, 19, subjecting each pin to a load sufficient to produce through friction the necessary locking force.

For this purpose, an eccentric control means with a rotating pivot 22 can be provided between the plates 1, 2, equipped with extreme eccentric portions 23, inserted in the respective slots 24 of the plates 18, 19, with axes perpendicular to the axes of the slots 21. In the movement position, the position of the slots 24 corresponds to an alignment position of the respective axes $a_1$ 1 and $a_2$ of the pivot 22 and of its portions 23, parallel to the direction of the axes of the slots 21.

A rotating member 25, which is an integral part of the pivot 22 enables the latter to perform a rotation around its axis $a_1$, according to which it is supported between the plates 1, 2, causing this way a translation in the direction of the axes of the slots 21 of the plates 18, 19, locking thereby the pins 5 between the edges of the respective holes in the plates 1, 2 and 18, 19, and arresting them by friction into the position they have reached under the effect of the model 13. This portion of the translatable plates is referred to as the locking position.

The eccentricity value "e" between the axis $a_1$ of the pivot 22 and the axis $a_2$ of the portions of the extremity 23 as well as the extensions of the slots 21 and 24 are represented in FIGS. 8, 9, for reasons of graphical clarity, much larger than the necessary value.

In particular, the eccentricity "e" has to be selected so that it provides with the rotation of 180° of the pivot 22, a translation of the plates 18, 19 with respect to the plates 1, 2 which causes the desired locking of the pins, also taking into account the plays between these pins and their respective holes.

The elements for the impression-forming of the fixture, under such conditions, are provided with an element for actuating the rotation of the pivot 22, convenient for the purpose of reaching of the dead point of maximum translation. The rotation of the pivot can be arrested, for instance with a stop mounted a little beyond the dead point and by other means, which can be retracted when the pins have to be cleared in order to change to shape of the impression.

As an alternate, other locking means can be used, for instance such as shaped combs inserted between the pins, or also magnetic means or such, corresponding to the size of the fixture and to the density of the pins.

We claim:

1. An assembly for supporting a workpiece for machining in an automatic machining line, said assembly comprising:
   a pair of parallel, spaced apart support plates formed with mutually registering holes in a regular pattern of spaced-apart rows of holes spaced from on another along a respective row;
   respective pins received in registering holes of said support plates and having axes perpendicular to said support plates, whereby said pins are disposed in a grid-like array in mutually spaced relation along respective mutually parallel rows with the rows of pins being mutually spaced apart transversely of the pin rows, said pins projecting from an upper one of said support plates in extended rest positions of said pins by a distance greater than a maximum depth of an impression to be formed by said array of pins to receive a workpiece, said pins being axially slidable from said rest position into retracted impression-forming positions relative to said support plates to form said impression; and
   means for frictionally arresting said pins in respective extended and retracted positions, said support plates, said pins and said means for frictionally arresting said pins forming a fixture displaceable with a workpiece received in the respective depression along said machining line, said means for frictionally arresting said pins comprising an elastic element disposed between rows of said pins and bearing continuously frictionally transversely directly on said pins to exert a friction force thereon greater than axial forces applied to said pins during support or a workpiece thereon, but less than force applied to said pins to form said impression and force applied to said pins to restore said pins to respective rest positions thereof, each of said elements being a strip forming a lamellar spring having notches along opposite longitudinal edges bearing on the pins of one row and a curved web between the notches along said longitudinal edges bearing on the pins of another row to generate said friction force on said pins while permitting axial sliding of said pins between the respective positions thereof.

2. The assembly defined in claim 1, wherein said pins each have corresponding ends adapted to receive said workpiece and opposite ends formed with flat heads of a diameter larger than that of said bores.

3. The assembly defined in claim 1, further comprising impression-forming means provided with a former having a shape corresponding to that of the workpiece to be received in said depression, located at an idle station of said line, and provided with pressing means for forcing said former into said array with said force applied to said pins to form said impression, thereby providing said impression in said array of a shape generally complementary to that of said workpiece and with contours generally corresponding to that of said workpiece.

4. The assembly defined in claim 3 wherein said former of said impression-forming means is a workpiece corresponding to the workpiece to be received in the impression of said fixture.

5. The assembly defined in claim 3 wherein said former of said impression-forming means is a model of the workpiece to be received in the impression of said fixture and with structural and surface strength sufficient to enable it to be pressed into said array by said pressing means.

6. The assembly defined in claim 3, further comprising resetting means along said line upstream of said impression-forming means and having a mobile member having a planar surface below said fixture for exerting said force applied to said pins to restore said pins to respective rest positions, thereby resetting said pins at the respective rest positions.

7. The assembly defined in claim 6, further comprising frictional locking means for additionally securing said pins against movement in said support plates, and control means actuatable for operating said frictional locking means.

8. The assembly defined in claim 1 wherein said parallel rows of pins are inclined to at least one vertical flank of the workpiece to be received by the fixture.

9. An assembly for supporting a workpiece for machining in an automatic machining line, said assembly comprising:
   a pair of parallel, spaced apart support plates formed with mutually registering holes in a regular pattern of spaced-apart rows of holes spaced from on another along a respective row;
   respective pins received in registering holes of said support plates and having axes perpendicular to said support plates, whereby said pins are disposed in a grid-like array in mutually spaced relation along respective mutually parallel rows with the rows of pins being mutually spaced apart transversely of the pin rows, said pins projecting from an upper one of said support plates in extended rest positions of said pins by a distance greater than a maximum depth of an impression to be formed by said array of pins to receive a workpiece, said pins being axially slidable from said rest position into retracted impression-forming positions relative to said support plates to form said impression; and
   means for frictionally arresting said pins in respective extended and retracted positions, said support plates, said pins and said means for frictionally arresting said pins forming a fixture displaceable with a workpiece received in the respective depression along said machining line, said means for frictionally arresting said pins comprising an elastic element disposed between rows of said pins and bearing continuously frictionally transversely directly on said pins to exert a friction force thereon greater than axial forces applied to said pins during support of a workpiece thereon, but less that force applied to said pins to form said impression and force applied to said pins to restore said pins to respective rest positions thereof,
   impression-forming means provided with a former having a shape corresponding to that of the workpiece to be received in said depression being located at an idle station of said line, and provided with pressing means for forcing said former into said array with said force applied to said pins to form said impression, thereby providing said impression in said array of a shape generally complementary to that of said workpiece and with contours generally corresponding to that of said workpiece, resetting means being provided along said line upstream of said impression-forming means and having a mobile member having a planar surface below said fixture for exerting said force applied to said pins to restore said pins to respective rest positions, thereby resetting said pins at the respective rest positions, the assembly further comprising frictional locking means for additionally securing said pins against movement in said support plates, and control means actuatable for operating said frictional locking means, said frictional locking means includes respective locking plates each juxtaposed to a respective one of said support plates and having holes in a corresponding pattern also traverse by said pins, said locking plates being laterally translatable relative to the support plates, said control means being constructed and arranged to laterally translate said locking plates between a movement position in which the holes of said locking and support plates are in perfect registry to permit said pins to slide therein and a locking position in which the holes of said locking plates are sufficiently offset from the holes of said support plates to retain said pins against sliding movement in said locking position.

10. The assembly defined in claim 9 wherein said control means included an eccentric coupling said locking plates to said support plates with a throw and eccentricity capable of shifting the locking plates relative to said support plates from said movement position to said locking position in one revolution of said eccentric.

11. An assembly for supporting a workpiece for machining in an automatic machining line, said assembly comprising:
   a pair of parallel, spaced apart support plates formed with mutually registering holes in a regular pattern of spaced-apart rows of holes spaced from one another along a respective row;
   respective pins received in registering holes of said support plates and having axes perpendicular to said support plates, whereby said pins are disposed in a grid-like array in mutually spaced relation along respective mutually parallel rows with the rows of pins being mutually spaced apart transversely of the pin rows, said pins projecting from an upper one of said support plates in extended rest positions of said pins by a distance greater than a maximum depth of an impression to be formed by said array of pins to receive a workpiece, said pins being axially slidable from said rest position into retracted impression-forming positions relative to said support plates to form said impression; and
   a plurality of elastic elements disposed between rows of said pins and bearing frictionally transversely on said pins to exert continuously a friction force thereon greater than axial forces applied to said pins during support of a workpiece thereon, but less than force applied to said pins to form said impression and force applied to said pins to restore said pins to respective rest positions thereof, each of said elements being a strip forming a lamellar spring formed with opposite longitudinal edges, said lamellar spring having notches along said opposite longitudinal edges separating tongues from one another along said edges, each of said tongues having a respective tongue edge bearing on the pins of one row and a curved convex web between corresponding tongues bearing on the pins of another row to generate said friction force on said pins while permitting axial sliding of said pins between the respective positions thereof, said support plates, said pins and said plurality of elastic elements forming a fixture displaceable with a workpiece received in the respective depression along said machining line.

12. An assembly for supporting a workpiece for machining in an automatic machining line, said assembly comprising:

a pair of parallel, spaced apart support plates formed with mutually registering holes in a regular pattern of spaced-apart rows of holes spaced from one another along a respective row;

respective pins received in registering holes of said support plates and having axes perpendicular to said support plates, whereby said pins are disposed in a grid-like array in mutually spaced relation along respective mutually parallel rows with the rows of pins being mutually spaced apart tranversely of the pin rows, said pins projecting from an upper one of said support plates in extended rest positions of said pins by a distance greater than a maximum depth of an impression to be formed by said array of pins to receive a workpiece, said pins being axially slidable from said rest position into retracted impression-forming positions relative to said support plates to form said impression;

means for frictionally arresting said pins in respective extended and retracted positions and including spring elements bearing directly and resiliently continuously against said pins, said support plates, said pins and said means for frictionally arresting said pins forming a fixture displaceable with a workpiece received in the respective depression along said machining line;

respective locking plates each juxtaposed to a respective one of said support plates and having holes in a corresponding pattern also traversed by said pins, said locking plates being laterally translatable relative to the support plates; and control means connected to said locking plates to laterally translate said locking plates between a movement position in which the holes of said locking and support plates are in perfect registry to permit said pins to slide axially therein and a locking position in which the holes of said locking plates are sufficiently offset from the holes of said support plates to retain said pins against sliding movement in said locking position.

13. The assembly defined in claim 12 wherein said control means include an eccentric coupling said locking plates to said support plates with a throw and eccentricity capable of shifting the locking plates relative to said support plates from said movement position to said locking position in one revolution of said eccentric.

* * * * *